UNITED STATES PATENT OFFICE.

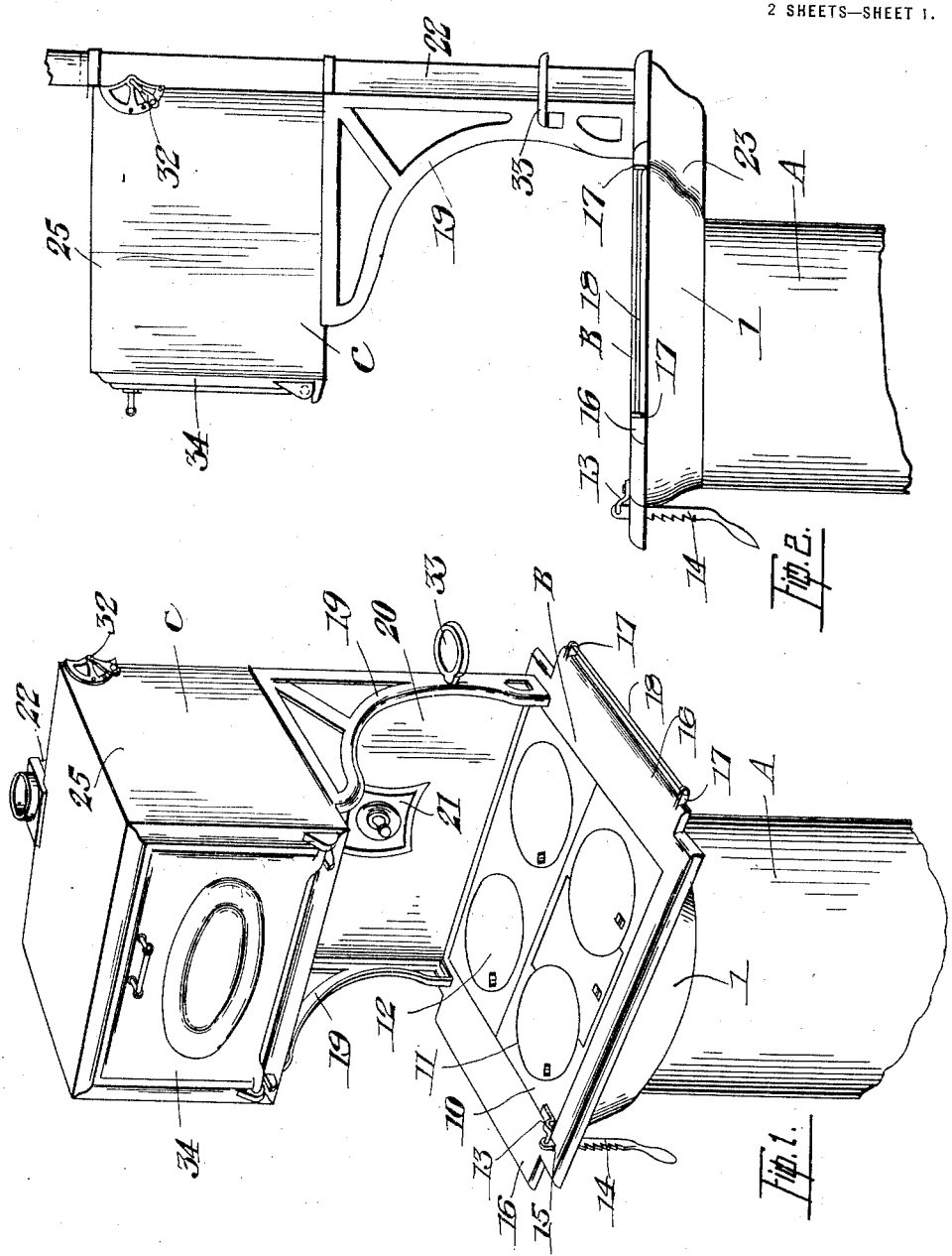

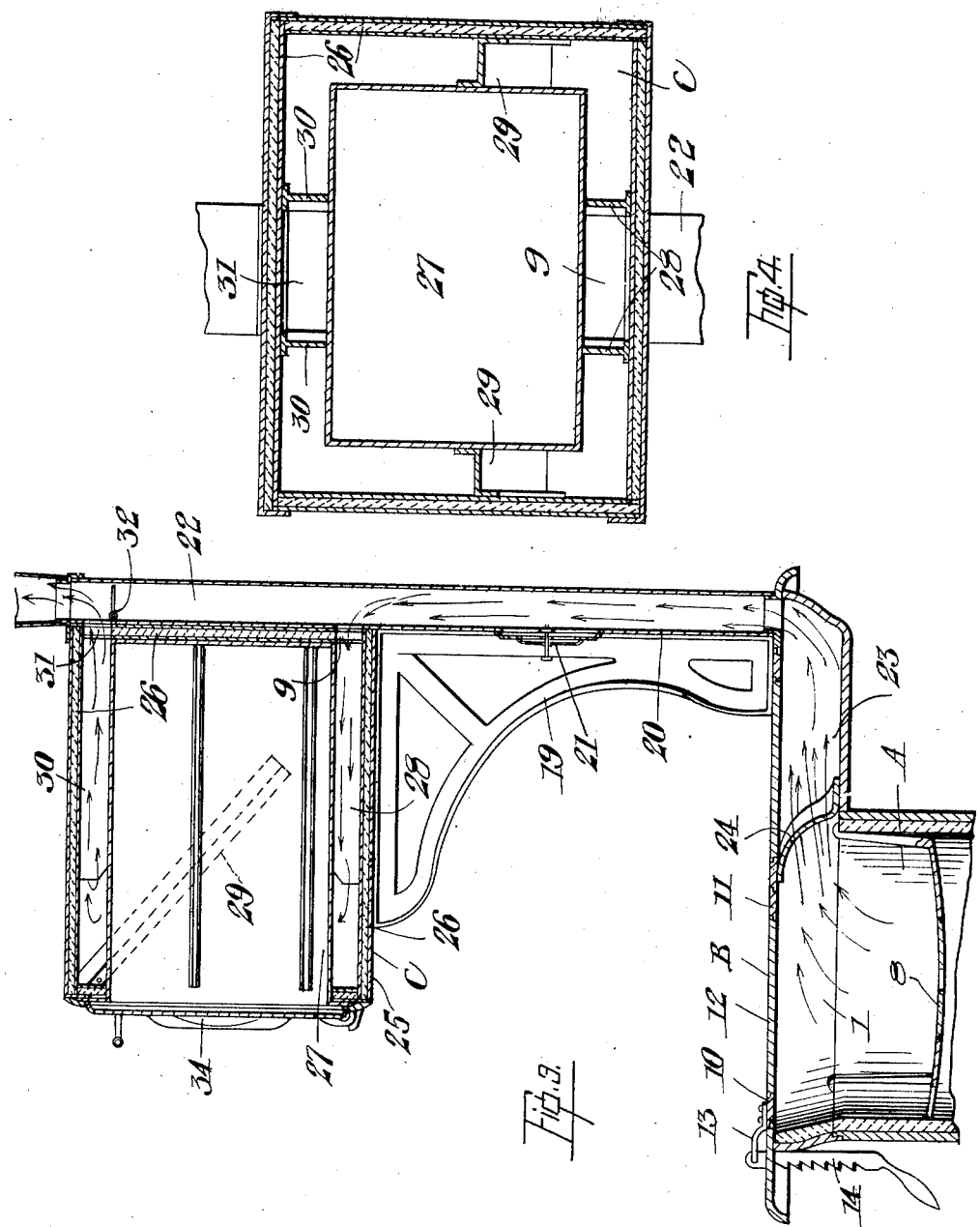

BENSON CLOTHIER BEACH AND JOHN HENRY BEEBY, OF OTTAWA, ONTARIO, CANADA.

COMBINED HEATING, COOKING, AND BAKING STOVE.

1,349,652.   Specification of Letters Patent.   Patented Aug. 17, 1920.

Application filed August 17, 1918. Serial No. 250,352.

*To all whom it may concern:*

Be it known that we, BENSON CLOTHIER BEACH and JOHN HENRY BEEBY, a subject of the King of Great Britain and a citizen of the United States, respectively, and residents of the city of Ottawa, Province of Ontario, Dominion of Canada, have invented certain new and useful Improvements in Combined Heating, Cooking, and Baking Stoves, of which the following is a specification.

This invention relates to improvements in combined heating, cooking and baking stove and the objects of the invention are to render the stove capable of being used either as a heating stove or as a combined heating and cooking stove or as a combined heating, cooking and baking stove.

Further objects are to simplify the superstructure of the stove and so locate the oven that it will be in a position readily accessible to the user of the stove and also to minimize floor space and whereby the heat of the products of combustion of the stove may be readily utilized to heat the oven, to provide damper means whereby a fast, slow or medium oven may be obtained, to insert baffle means in the path of the products of combustion, so that the said products of combustion will be made to travel under and upwardly past the sides of and over the top of the oven to uniformly heat the same in a manner best calculated to meet the requirements of the baking about to be performed.

Further objects are to support the oven by suitable bracket means from the top of the stove, in such a manner that the flue or smoke pipe will be located behind the oven, so that the full effect of the products of combustion passing through the flue will be utilized, to provide means whereby the flame and products of combustion will be broken up and spread and thus permit of the said flames and products of combustion giving up the necessary amount of heat units both to the cooking top of the stove and to the baking oven.

Further objects still are to provide means for regulating the cooking top of the stove whereby it may be adapted for broiling purposes and also for gaining access into the combustion chamber should such be found necessary, to permit of the ready cleaning of the flue or charging fuel, to provide extension wings or shelves on the cooking top of the stove, and permit of removable towel rods being attached to such wings whereby kitchen towels, etc., may be readily dried, to provide teapot stands on the oven supporting brackets, to permit of wood, coal or other fuel being used, and generally to adapt the several parts of the stove to better perform the functions required of them.

With the above and other objects in view, the invention consists essentially of the improved construction particularly described and set forth in the following specification and accompanying drawings forming part of the same.

In the drawings:

Figure 1 is a fragmentary perspective view of a heating stove showing the improved cooking and oven attachment thereon.

Fig. 2 is a side elevation of the same.

Fig. 3 is a vertical section of the improved combined heating, cooking and baking stove.

Fig. 4 is a transverse section through the oven.

Like characters of reference refer to like parts in the several figures.

Referring to the drawings, A represents a heater which may be of cylindrical or other suitable formation, on the upper end of which a cooking top B is mounted. This cooking top B may be of suitable shape and provided with a removable plate 10 formed with a plurality of orifices 11 which may be normally covered by removable lids or covers 12.

The plate 10 is provided adjacent to the front end thereof with a bracket 13 to which a notched handle 14 is attached and this notched handle slidably operates through an orifice 15 in the top B.

The notched handle 14 may be elevated or lowered and held in the desired position, so that the plate 10 will be open toward the front and thus permit of the stove being used for broiling purposes or for adding fuel.

The top B is formed on the lateral edges with extension wings or shelves 16 which are removable and provided with lateral extending lugs 17 to which the towel rods 18 are operatively connected.

These towel rods are rotatable which facilitate positioning the towel for drying or like purposes.

At the rear of the cooking top B and toward the sides thereof a pair of brackets 19 are located which extend upwardly and are adapted to support the oven C, the space between the brackets 19 being filed in by a back plate 20 provided with a check damper 21 whereby the draft in the flue 22 which extends from the rear of the cooking top B is controlled.

The flue 22 may be of suitable size and shape and communicates with a combustion chamber 23 extending rearwardly of the heating stove A, and at the outlet of the combustion chamber a flame spreader 24 operating in conjunction with a depressed sub-top 1 or other form of attachment is provided.

It will be seen that the sub-top fits closely to the cylindrical heater and then flares outwardly to the flat cooking top, the flue 22 connecting to the sub-top through a combustion chamber 23 at the back thereof.

This permits of the products of combustion yielding their heat units evenly and uniformly to the top of the stove B in the manner to be made clear hereafter.

The products of combustion re-unite after passing the spreader and are delivered to the flue 22 behind the plate 20 and oven C.

The oven C consists of an outer casing 25 constructed of spaced walls filled with a non-conducting filling 26 such as asbestos or the like and concentrically located in this casing is the oven proper or chamber 27.

This central chamber or oven 27 is spaced from the outercasing 25 by baffle walls 28 which are arranged in pairs on the bottom of the central chamber 27 and these baffle walls extend only partially forward of the oven as shown in Fig. 3, so that the products of combustion after entering the passageway 9 formed by the said baffle walls will pass forwardly under the oven and then rearwardly back under the oven, from whence the products of combustion will pass upwardly between the sides of the central chamber or oven 27 and the inner walls of the outer casing 25.

In order to obtain the best results and a maximum of heat from the products of combustion we provide diagonal or angularly disposed baffle walls 29 at each side of the central chamber or oven 27 and between the side wall thereof and the inner side wall of the casing 25, while along the top of the oven we provide a pair of baffle walls 30 which only extend part of the depth of the oven, and the passageway 31 formed by the baffle walls 30 communicates with the upper part of the flue 22 of the heating stove.

It is advisable that the products of combustion should be properly controlled and to this end we provide a pivoted drop damper 32 which may be adjusted into a number of different angular positions, and when fully open will close the passageway 31 formed by the baffle plates 30, in which position the oven C will be extremely slow and the products of combustion will pass directly through the flue 22 and upwardly to a smoke stack.

By adjusting the damper 32 into an angular position part of the products of combustion will be caused to pass through the passageway 9 and upwardly around the sides of the central chamber or oven 27 and through the passageway 31 into the upper portion of the flue 22, while another percentage of the products of combustion will pass directly upwardly through the flue 22, so that in this way a medium oven is obtained.

When however, a strong baking oven is necessary the damper 32 will be operated, so that it will occupy a position shown in Fig. 3, in which case all the products of combustion will be pocketed in the back flue 22 and then circulated around the central chamber or oven 27, passing through the passageway 9 around the baffle plates 28, upwardly along the sides of the central chamber 27 where they will impinge with the angularly disposed baffle wall 29 where again the products of combustion will be pocketed and be caused to pass downwardly and then up again around the sides of the said chamber and across the top thereof being ultimately delivered through the passageway 31 into the upper portion of the flue 22, in this way uniformly heating the oven from five sides to a temperature necessary to perform certain operations of baking.

As the temperature of the different seasons vary considerably it will be found that in the winter a very high fire may be necessary in the heating stove A and under such circumstances the damper 32 may be set, so that the oven C will not be too hot and a proper regulation of the temperatue will be obtained by adjusting the damper 32 to the desired extent.

In the summer or other months, when heat is not required and it is only necessary to use the stove for cooking and baking purposes, the fire will be kept low and by the proper adjustment of the damper 32 a baking oven can be readily obtained even with a low fire.

The adjustment of the damper 32 also permits of a proper cooking heat being obtained, that is to say the heat will be properly delivered to the top B and the use of the flame spreader 24 also facilitates obtaining this desired uniform heat.

The stove may be used in summer without radiating much heat with wood fuel and to this end we provide a removable suspended grate 8 in the upper section of the stove A. This grate is removed when coal fuel is used.

A teapot stand 33 is provided on the brackets 19 and the front of the oven is normally closed by a hinged door 34 which opens outwardly and downwardly while the oven is provided with the usual trays and if necessary a thermometer may be provided in the oven door to register the temperature of the oven.

From this description it will be seen that we have invented a combined cooking, heating and baking stove, which can be advantageously utilized in households, and whereby a maximum efficiency will be obtained and a regulation of heat to the several parts of the stove quickly obtained when it is necessary to use the stove for cooking, baking or other purposes.

As many changes could be made in the above construction and many apparently widely different embodiments of our invention within the scope of the claim, constructed without departing from the spirit or scope thereof, it is intended that all matter contained in the above specification and accompanying drawings shall be interpreted as illustrative and not in a limiting sense.

What we claim as our invention is:

The combination with a stove of a flue, an elevated oven having spaced walls on the top, bottom and sides, a space between the walls at the top and bottom communicating with the flue baffles extending forwardly below the oven, diagonally extending baffle walls in the spaces at the side of the oven extending from the uppermost front corner diagonally toward and nearly to the lower rear corner, and baffle walls in the space between the walls at the top of the oven extending forwardly from the rear end of the oven and adapted to cause the products of combustion to pass forwardly before passing into the flue.

In witness whereof we have hereunto set our hands.

BENSON CLOTHIER BEACH.
JOHN HENRY BEEBY.